United States Patent
Dagh

(10) Patent No.: US 6,203,206 B1
(45) Date of Patent: Mar. 20, 2001

(54) SEALING DEVICE FOR BEARING ARRANGEMENTS AND ARRANGEMENT FOR SEALING OF A BEARING DEVICE

(75) Inventor: Ingemar Dagh, Hisings Backa (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/180,290

(22) PCT Filed: May 5, 1997

(86) PCT No.: PCT/SE97/00753

§ 371 Date: May 6, 1999

§ 102(e) Date: May 6, 1999

(87) PCT Pub. No.: WO97/42425

PCT Pub. Date: Nov. 13, 1997

(30) Foreign Application Priority Data

May 6, 1996 (SE) .................................. 9601738

(51) Int. Cl.[7] .................................. F16C 33/78
(52) U.S. Cl. .................. 384/489; 384/477; 384/551
(58) Field of Search .................. 384/551, 484, 384/486, 489, 477

(56) References Cited

U.S. PATENT DOCUMENTS 5,242,229  9/1993  McLarty .
5,492,419 * 2/1996  Miller et al. .......................... 384/551

FOREIGN PATENT DOCUMENTS

| 42 22 852 A1 | 1/1994 | (DE) . |
| 42 26 618 A1 | 2/1994 | (DE) . |
| 195 26 167 A1 | 1/1996 | (DE) . |

* cited by examiner

Primary Examiner—Lenard A. Footland
(74) Attorney, Agent, or Firm—Lerner, David, Littenberg, Krumholz & Mentlik, LLP

(57) ABSTRACT

Apparatus for sealing bearing assemblies includes a first bearing with a first inner race, a second bearing with a second inner race, a shaft, the first and second inner races being juxtaposed on the shaft with their inner surfaces facing the shaft, thus forming a gap between opposing edges of the races, the opposing edges of the first and second inner races are beveled to form a deformation. The apparatus has an annular ring including a positioning member having an inwardly projecting edge for axially positioning the annular ring on the first and second inner races, and a seal for sealing the annular ring against the first and second inner races. The inwardly projecting edge of the positioning member engages the beveled opposing edges of the first and second inner races so that oil supplied between the shaft and the inner surfaces of the races is prevented from flowing through the gap.

8 Claims, 2 Drawing Sheets

SEALING DEVICE FOR BEARING ARRANGEMENTS AND ARRANGEMENT FOR SEALING OF A BEARING DEVICE

FIELD OF THE INVENTION

The present invention relates to a sealing device. More particularly, the present invention has its main application in connection with bearing assemblies for wheel axles of motor vehicles.

BACKGROUND OF THE INVENTION

In connection with motor vehicles, different types of bearings may be utilized for supporting the wheels on their respective wheel axles. Where, for instance, heavier commercial vehicles are concerned, the rear wheels may be carried on bearings on the rear axle of the vehicle by means of two roller bearings mounted next to each other. According to the prior art, these roller bearings are typically arranged side by side so that they bear on each other. The roller bearings are kept together in an unmounted condition by means of a bearing ring, which is substantially annular, and which is mounted on the rear axle.

Within the internal surfaces of the inner races of the bearings, i.e. on the surfaces which constitute the inside of the inner races and the outside of the rear axle itself, a thin layer of oil must be supplied for the purpose of protecting the bearings and the rear axle from corrosion. This oil is successively supplied through the interior of the rear axle and is conducted in between the peripheral surface of the rear axle and the inner side of each respective roller bearing.

Furthermore, according to the prior art, the roller bearings themselves are lubricated by bearing grease. This bearing grease is applied when assembling the roller bearings and is retained on the bearing rollers and bearing races by means of seals.

A problem which occurs in connection with these previously known rear axle assemblies is related to the fact that a small gap or interval is formed between the inner races of the two roller bearings. This, in turn, creates the risk that the oil layer between the insides of the roller bearings and the rear axle can penetrate through this gap during operation of the vehicle. This may occur as a result of the small movements which always arise in the rear axle during operation of the vehicle, in which case the gap between the inner races cannot be kept completely sealed.

The fact that oil leaks out in a radial direction through the gap between the two bearings entails certain disadvantages. On the one hand, the oil is harmful to the bearing grease of the roller bearings. On the other hand, the oil may contain impurities in the form of small particles which may be deposited on the bearings, something which naturally is a disadvantage. A further disadvantage with such leakage is that the surf ace of the rear axle and the internal surfaces of the inner races risk running dry, which in turn creates a risk of contact corrosion between the bearings and the rear axle. This means, for instance, that wheel changes are rendered considerably more difficult.

In light of the above-mentioned problems, there is a need for seals, which can seal the gap between the inner races. However, this presents further difficulties, among other things resulting from the fact that the area around the gap becomes inaccessible once the bearings have been pressed into position. This results in difficulties when mounting the bearings and seals for such bearings.

SUMMARY OF THE INVENTION

The object of the present invention is to provide an improved sealing device, which is primarily intended for sealing in connection with bearing assemblies on wheel axles of motor vehicles, whereby the disadvantages of previously known devices of this kind are overcome.

In accordance with the present invention, this and other objects have now been realized by the discovery of apparatus for sealing bearing assemblies comprising a first bearing including a first inner race, a second bearing including a second inner race, a shaft, the first and second inner races including an inner surface and being juxtaposed on the shaft with the inner surfaces facing the shaft, whereby a gap is formed between the first and second inner races, a substantially annular sealing member mounted on the first and second inner races, the substantially annular sealing member including a positioning member for axially positioning the substantially annular sealing member on the first and second inner races, and sealing means for sealing the substantially annular sealing member against the first and second inner races, whereby oil supplied between the shaft and the inner surfaces of the first and second inner races is prevented from flowing through the gap. In a preferred embodiment, at least one of the first and second inner races includes a deformation, and the positioning member includes an edge portion for interaction with the deformation.

In accordance with one embodiment of the apparatus of the present invention, the sealing means comprises at least one O-ring.

In accordance with another embodiment of the appartus of the present invention, the sealing means comprises a pair of sealing members, and the substantially annular sealing member includes a pair of peripheral grooves on either side of the substantially annular sealing member, whereby the pair of peripheral grooves supports the pair of sealing members.

In accordance with another embodiment of the apparatus of the present invention, the first and second inner races form a deformation therebetween, whereby the positioning member may interact with the deformation. In a preferred embodiment, the first and second inner races include peripheral angled surfaces forming a groove-shaped recess comprising the deformation. In another embodiment, the first and second inner races include peripheral beveled edges forming a groove-shaped recess comprising the deformation. Preferably, the positioning member comprises a peripheral edge portion for interaction with the deformation. In a preferred embodiment, the sealing means comprises a pair of O-rings.

The present invention is comprised of a sealing device which is intended to be utilized in connection with a bearing assembly, comprising a first bearing with a first inner race and a second bearing with a second inner race, which inner races are arranged next to each other on a shaft so that a gap is formed between the inner races. Furthermore, oil is supplied between the shaft and the surfaces of the inner races facing the shaft. According to the present invention, the sealing device comprises a substantially annular member for mounting on the inner races. The annular member comprises a positioning member for positioning of the sealing device in an axial direction in relation to the inner races, as well as sealing members for sealing against each respective inner race.

BRIEF DESCRIPTION OF THE DRAWINGS

In the following detailed description , the present invention will be described in greater detail with reference to an embodiment which is shown in the attached drawing in which.

DETAILED DESCRIPTION

Figure 1:
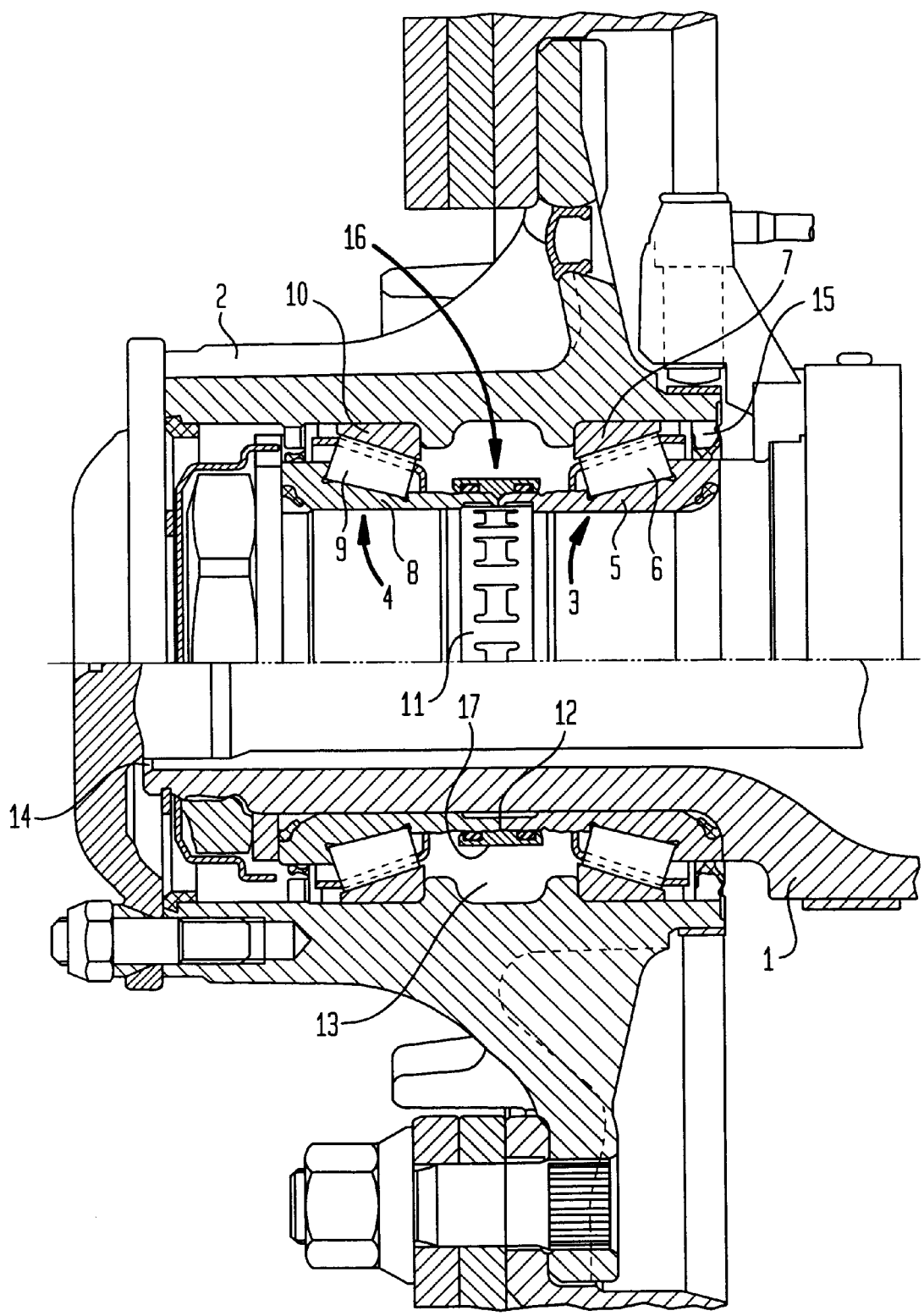
FIG. 1 is a side, elevational, partially cross-sectional view of a rear axle provided with a sealing device according to the present invention.

Referring to the drawings, in which like reference numerals refer to like elements thereof, in FIG. I a sealing device according to the present invention is shown. According to this preferred embodiment, the present invention is arranged in connection with a rear axle 1 of a motor vehicle which, for example, may be a commercial vehicle. On the rear axle 1, a wheel center 2 for at least one wheel (not shown) is arranged. The wheel center 2 is suspended on the rear axle I by means of an inner roller bearing 3 and an outer roller bearing 4. The inner roller bearing 3 comprises a first inner race 5, a number of bearing rollers 6 and a first outer race 7. In a corresponding manner, the outer roller bearing 4 comprises a second inner race 8, a number of bearing rollers 9, and a second outer race 10.

The first inner race 5 and the second inner race 8 are arranged next to each other on the rear axle 1. Furthermore, the inner races, 3 and 4, are fixed in a predetermined axial position along the rear axle 1 by means of an annular bearing ring 11. During operation, the roller bearings, 3 and 4, are consequently arranged next to each other in a manner such that an interval or gap 12 is formed between the end edges of the inner races, 5 and 8, which are facing each other.

Between the roller bearings, 3 and 4, there is a space 13 which is filled with bearing grease intended for lubrication of the roller bearings, 3 and 4. Furthermore, according to the above introduction, oil is supplied between the peripheral surface of the rear axle 1 and the internal surfaces of each respective inner race, 5 and 8. The oil is successively fed from a (not shown) oil tank, through the interior of the rear axle 1, and through an opening 14 at the end of the rear axle 1. The oil is utilized for corrosion protection of the rear axle 1 and the bearings, 3 and 4, and is, for this purpose, conducted along the outside of the rear axle 1 by means of a guide track (not shown) and further between the peripheral surface of the rear axle 1 and the internal surface of each respective inner race, 5 and 8. A seal 15 is provided in order to prevent the oil from being transported away from its intended location.

Figure 2:
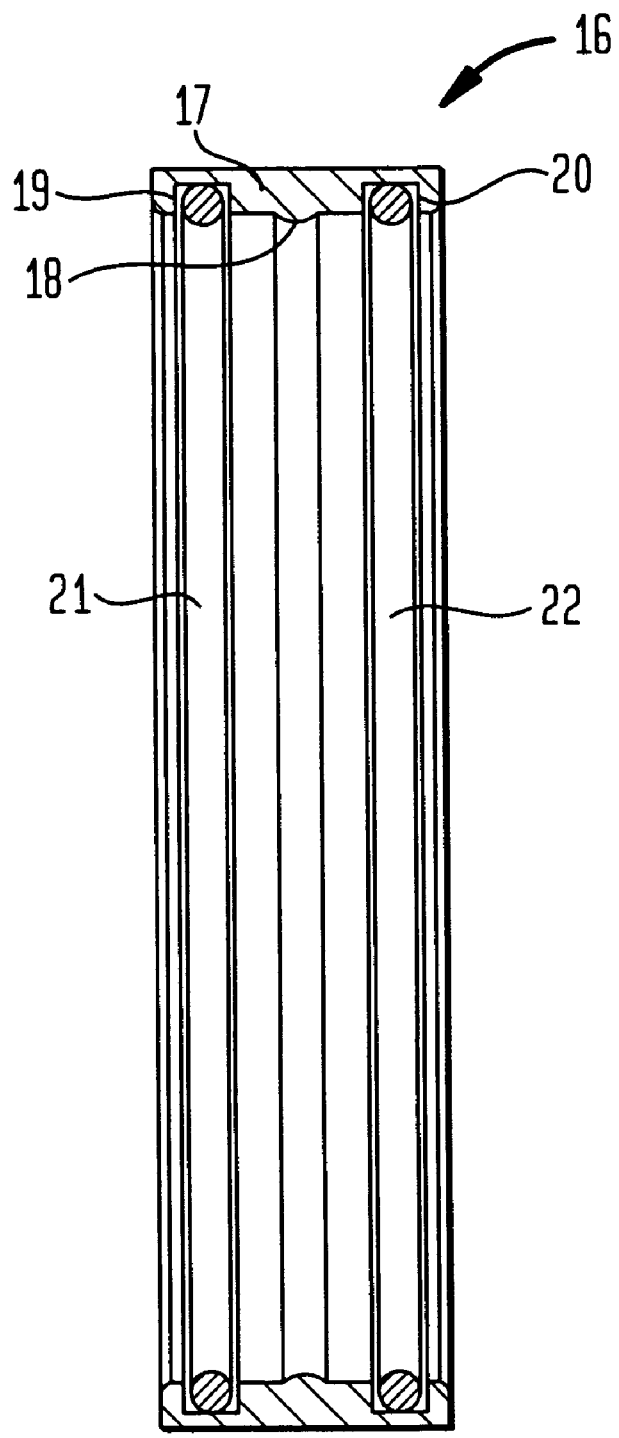
FIG. 2 a front, elevational, enlarged cross-sectional view of a sealing device according to the present invention.

According to the above explanation, there is a risk that oil can penetrate through the gap 12 and further into the space 13 which is intended for bearing grease. For this reason, according to the present invention, a special sealing device 16 is arranged in the vicinity of this gap 12. The sealing device 16, which is shown separately in FIG. 2, is composed of a substantially annular member 17, which is preferably made of steel or a corresponding material. The side of the ring 17 which is turned inwards, as seen in a radial direction, is designed with a peripheral projecting edge 18 which is intended to abut on the two inner races, 5 and 8, at the gap 12, as is shown in FIG. 1. For this purpose, the mutually facing edge portions of the inner races, 5 and 8, are slightly beveled, which implies that the sealing device 16 may be mounted so that the edge 18 serves as a locking or positioning member. In this manner the sealing device 16 may be positioned in a correct axial position in relation to the inner races, 5 and 8.

Again referring to FIG. 2, it is evident that the ring 17 is designed with two peripheral grooves, 19 and 20, which are accommodated on both sides of the edge 18. The respective grooves, 19 and 20, each accommodate an O-ring, 21 and 22, of a substantially conventional type, i.e. of rubber or similar material. The two O-rings, 21 and 22, bear tightly on each respective inner race, 5 and 8 (cf. FIG. 1).

When mounting the roller bearings, 3 and 4, firstly the sealing device 16 is mounted in position on the inner roller bearing 3. Thereafter, the inner races, 5 and 8, of the roller bearings, 3 and 4, are joined by means of the bearing ring 11. When mounting, it is ensured that the edge 18 in the ring 17 facing inwards will be positioned at the gap 12 between the inner races, 5 and 8. Since the beveled surfaces of the inner races, 5 and 8, are placed next to each other, they form a deformation in the form of a groove or recess which corresponds to the shape of the edge 18 on the sealing ring 17. When the sealing device 16 has been mounted in its correct position and the roller bearings, 3 and 4, are in place on the axle 1, there is consequently no risk that the sealing device 16 can end up in the wrong position in relation to the roller bearings, 3 and 4.

The present invention is not limited to the above-mentioned embodiments, but may be varied within the scope of the appended claims. For instance, according to one variant of the present invention, the sealing device may comprise a cured steel ring which is designed with peripherally arranged sealing members which seal in the same manner as the above-mentioned O-rings, 21 and 22. In applications with high pressures, however, O-rings are preferred.

According to one variant of the present invention, the edge 18 facing inwards may be substituted by a loose annular thread or ring which is placed in a peripheral groove which is accommodated in the inside of the sealing ring 17. In this manner, a positioning function may be obtained for the sealing device 16.

Furthermore, the present invention is not limited to be used on rear axles of motor vehicles, but may also be utilized on other types of shafts which comprise grease-lubricated bearings which are arranged in environments with contaminated oil.

Instead of the beveled edges of the inner races, 5 and 8, (with which the edge 18 facing inwards interacts), the first inner race 5 may for example be designed with a deformation, e.g. a peripheral groove, with which the edge 18 may interact. In this manner, the sealing device may be correctly positioned.

Finally, it is to be noted that the present invention may be utilized on different types of bearings, e.g. roller bearings.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for sealing bearing assemblies comprising a first bearing including a first inner race, a second bearing including a second inner race, a shaft, said first and second inner races including an inner surface and being juxtaposed on said shaft with said inner surfaces facing said shaft, whereby a gap is formed between opposing edges of said first and second inner races, the opposing edges of said first and second inner races being beveled, a substantially annular sealing member mounted on said first and second inner races, said substantially annular sealing member including a positioning member having an inwardly projecting edge for axially positioning said substantially annular sealing member on said first and second inner races, and sealing means for sealing said substantially annular sealing member against said first and second inner races, wherein the inwardly projecting edge of said positioning member engages the beveled opposing edges of said first and second inner races so that oil supplied between said shaft and said inner surfaces of said first and second inner races is prevented from flowing through said gap.

2. The apparatus of claim 1 wherein said sealing means comprises at least one O-ring.

3. The apparatus of claim 1 wherein said sealing means comprises a pair of O-rings, and said substantially annular sealing member includes a pair of peripheral grooves on either side of said substantially annular sealing member, whereby said pair of peripheral grooves supports said pair of.

4. The apparatus of claim 1 wherein the beveled opposing edges of said first and second inner races form a deformation, wherein said inwardly projecting edge of said positioning member engages said deformation.

5. The apparatus of claim 4 wherein said deformation includes peripheral angled surfaces forming a groove-shaped recess.

6. The apparatus of claim 4 wherein said deformation includes peripheral beveled edges forming a groove-shaped recess.

7. The apparatus of claim 5 or 6 wherein the peripheral edge portion of said positioning member engages said deformation.

8. The apparatus of claim 5 or 6 wherein said sealing means comprises a pair of O-rings.

* * * * *

UNITED STATES PATENT AND TRADEMARK OFFICE
CERTIFICATE OF CORRECTION

| | | |
|---|---|---|
| PATENT NO. | : 6,203,206 B1 | Page 1 of 1 |
| DATED | : March 20, 2001 | |
| INVENTOR(S) | : Dagh | |

It is certified that error appears in the above-identified patent and that said Letters Patent is hereby corrected as shown below:

<u>Column 2,</u>
Line 65, after "drawing" insert -- , --.

<u>Column 5,</u>
Line 19, after "of" insert -- O-rings --.

Signed and Sealed this

Fifteenth Day of January, 2002

Attest:

JAMES E. ROGAN
*Director of the United States Patent and Trademark Office*

*Attesting Officer*